Feb. 28, 1950        J. H. WILSON        2,499,287
POWER TRANSMISSION MECHANISM
Filed July 18, 1944
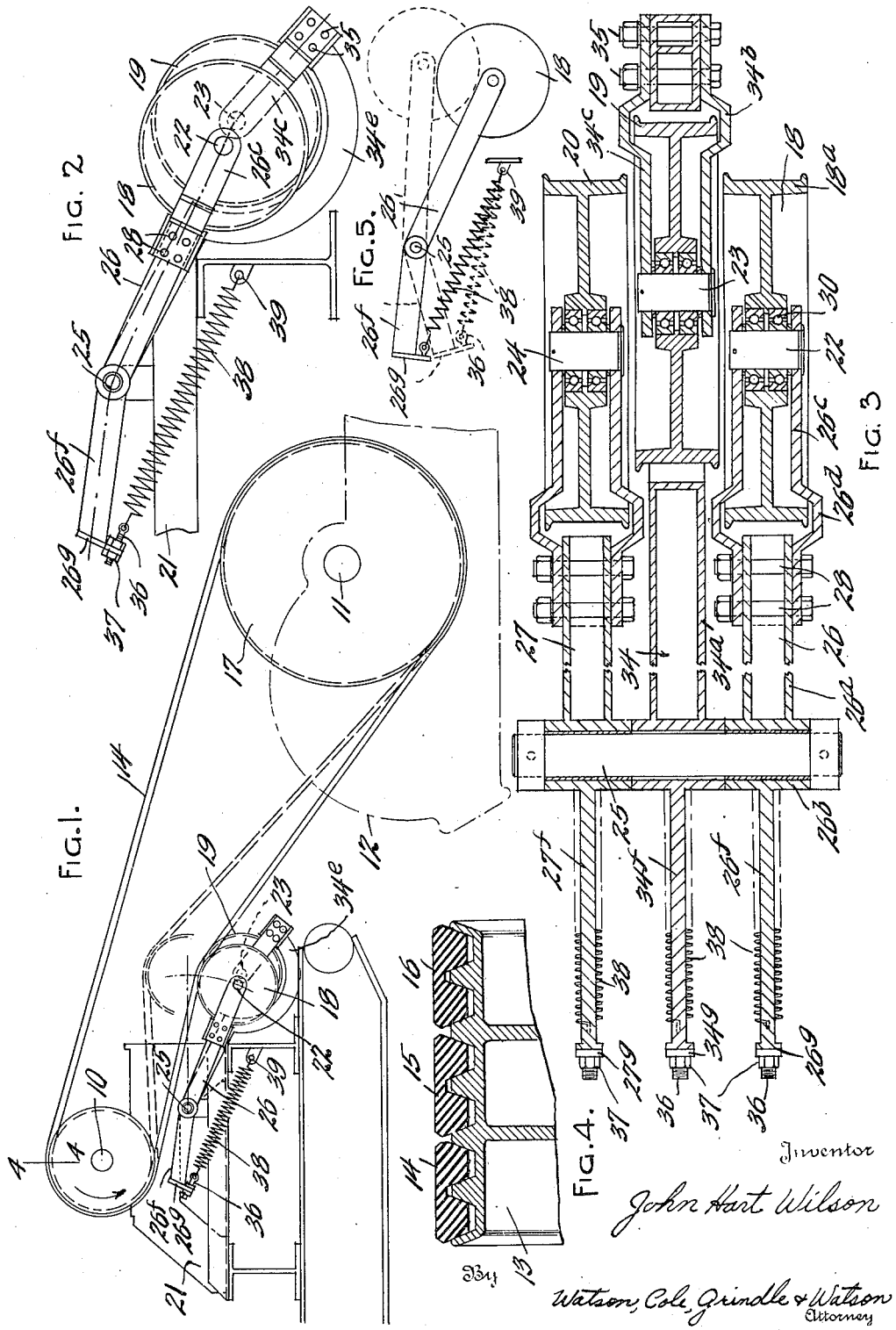
Inventor
John Hart Wilson
By Watson, Cole, Grindle & Watson
Attorney Patented Feb. 28, 1950

2,499,287

UNITED STATES PATENT OFFICE 2,499,287

POWER TRANSMISSION MECHANISM

John Hart Wilson, Wichita Falls, Tex.

Application July 18, 1944, Serial No. 545,488

6 Claims. (Cl. 74—242.11)

This invention relates to power transmission mechanism and particularly to mechanism of this class which includes belts and pulleys for the transmission of torque from a drive shaft to a shaft to be driven.

Numerous power transmission mechanisms of the pulley and belt type have been heretofore designed and suggested and many used with eminent success in factories and in field installations. Where the power to be transmitted from one shaft to another is very considerable the type of belt transmission which includes a plurality of independent belts is frequently utilized. The advantages of employing a plurality of relatively small belts in lieu of a single large belt are well understood, as are likewise the advantages of using individual driving belts which are substantially V-shaped in cross section, and which enter V-shaped grooves in the driving and driven posts. The V-belt drive is very widely used.

Wherever belt drives are employed, however, the problem of belt stretching exists and must be adequately met, all types of flexible endless belts tending to lengthen under continued use. In order to maintain close contact of the belt with each of the pulleys around which it passes an idler is customarily employed, such idler pulley being resiliently urged against one reach of the belt os that, as looseness occurs it is automatically taken up. Where a multiple V-belt drive is employed there must of necessity be utilized a plurality of idler pulleys, one idler for each belt, and it is the particular purpose of the present invention to provide a power transmission mechanism of the multiple belt type having a novel and improved idler mechanism for automatically taking up the slack in each individual belt of the drive. Naturally, in a multiple belt drive, it is desirable to maintain the belts close together in immediately adjacent parallel planes in order to minimize the length of the driving pulley and the length of the driven pulley. In accordance with my invention a novel idler pulley supporting mechanism is provided whereby, notwithstanding the fact that the driving belts are spaced apart only very slightly, the individual idler pulleys may freely and independently function without interfering with each other. The improved idler construction permits a compactness of the entire drive which cannot be otherwise obtained.

The novel and improved idler mechanism is also so designed that the resilient means which is associated with each idler and which serves to yieldingly urge that idler against the belt with which it cooperates is so arranged with respect to the idler supporting member that, notwithstanding considerable variation in the position of the idler, the force exerted and tending to advance the idler remains substantially constant. Other novel features and advantages of the invention will become apparent to one skilled in the art. In the accompanying drawings one form of the invention is illustrated by way of example. It will be appreciated that minor changes in the design and arrangement of the component elements of the invention may be made, without involving departure therefrom.

In the drawings:

Figure 1 shows in side elevation, rather diagrammatically, a multiple belt drive having the improved idler mechanism incorporated therein;

Figure 2 is a generaly similar view but showing only the idler mechanism;

Figure 3 is a section on line 3—3 of Figure 2;

Figure 4 is a section on line 4—4 of Figure 1; and

Figure 5 is a diagram primarily intended to show that an idler advancing spring remains substantially unchanged in length even though the associated idler is advanced substantially as the belt which it engages recedes.

The improved power transmission mechanism may be employed in association with any type of machine and has been found particularly useful in the transmission of power from a drive shaft such as indicated at 10 to the driven shaft 11 of a pump or the like, portion of the casing of a pump drive being indicated in dotted lines at 12 in Figure 1. Such a power transmission mechanism may include any number of belts and, as indicated in Figure 4, the pulley 13 fixed on drive shaft 10 is provided with three belt-receiving portions, to be engaged by the three belts 14, 15 and 16, respectively, each belt being preferably formed with two V-shaped pulley-engaging portions which are adapted to closely engage correspondingly shaped grooves formed in the pulley. Naturally the surface of pulley 17 fixed upon driven shaft 11, is similarly formed. The belts 14, 15 and 16 are closely spaced as clearly apparent in Figure 4, which is desirable, and the idler pulleys, which are indicated at 18, 19 and 20, respectively, must, if they are positioned adjacent each other, be quite closely spaced.

It is desirable to support the several idlers upon the same frame, generally indicated at 21, which supports the drive shaft 10 and to have them disposed in side-by-side relationship. The idler mounting means contemplated by the invention permits this arrangement. It will be observed that each idler is mounted upon an axle, the several axles being indicated at 22, 23 and 24, respectively. The several idler supporting axles are carried by levers all three of which are mounted for rocking movement upon a single supporting shaft indicated at 25. Each of these levers is of the simple type, being pivotally supported upon shaft 25 intermediate its ends, and the axle supporting arms of two of them, i. e., levers 26 and 27, are substantially straight, extending radially from shaft 25, with bifurcated outer ends the spaced elements of which are on opposite sides of the associated pulleys. Arm 26, for instance, includes a short section 26a the inner end of which is integral with or attached to the bearing portion 26b which encircles shaft 25. To the outer end of section 26a of the lever arm 26 are rigidly secured, as by means of bolts 28, two generally parallel members 26c which are likewise disposed radially of shaft 25 and extend outwardly on opposite sides of idler 18 to points in advance of the axle 22, members 26c being provided with aligned apertures for the reception of the axle.

Any suitable type of bearing such as the ball bearing indicated at 30 may encircle the axle intermediate the members 26c to facilitate free rotation of the idler pulley 18. The idler pulley has a relatively wide felly or rim 18a to contact the belt against which it is to continually bear and is also necessarily provided with side guards or flanges 18b to prevent lateral displacement of the associated belt. Where members 26 pass the rim or felly portion 18a of the idler each must be laterally deflected to provide the necessary clearance, these lateral deflections being indicated at 26d in Figure 3. Each idler pulley supporting arm 26 must, therefore, be relatively wide at least at one point along its length, i. e., where its bifurcations pass around the felly of the associated idler pulley, and it is not possible to greatly reduce the width of the supporting arm at this point.

For that reason the wider or thicker portions of the several idler supporting arms are so positioned with relation to each other as not to interfere while, at the same time, complete freedom of relative movement of the idlers in parallel planes is permitted. Thus the arm 27 which supports idler 20 is formed exactly as the arm 26 which supports the idler 18, but the arm 34 which supports intermediate idler 19 is so shaped that its widest portion 34b is located beyond the peripheries of the idlers 18 and 20, the bifurcations 34c of this arm being rigidly attached, as by bolts 35 to the end of a semicircular curved portion 34e of arm 34 which is rigid or integral with the inner radial portion 34a of that arm and encircles the rim or felly of the pulley 19, passing beneath the pulley as shown in Figures 1 and 2 in order that the uppermost elements of the pulley may make contact with the associated belt 15. By so designing the pulley supporting arms 26a, 27a and 34a of the several levers 26, 27 and 34 the idler pulleys may be disposed in close parallel relationship to each other while at the same time retaining complete freedom of movement and one such idler may move, for instance, from the position in which it is shown in full lines in Figure 1 to the position in which it is indicated in dotted lines in that figure, without interference with either of the other idlers.

The several levers 26, 27 and 34 also include oppositely extending arms 26f, 27f and 34f, respectively, and each of these arms terminates in a downwardly extending flange, these flanges being indicated at 26g, 27g and 34g. To each flange is connected, as by means of a bolt 36 with associated nuts 37 fixed on the bolt on opposite sides of the flange, one end of an elongated helical tension spring 38, the opposite end of which is connected to a stationary element 39 which may conveniently be a portion of the frame. The spring 38 extends in a direction generally parallel to that of the lever immediately above it and to which it is connected and the lever in turn extends in a direction generally parallel to that portion of the belt which lies immediately above. Angular movement of the lever, as the associated belt stretches, does not effect substantially this parallel relationship of the spring and lever, as may be seen from an inspection of Figure 5 in which a lever is shown in different angular positions, and the downward movement of that end of the lever to which the spring is connected does not cause material shortening of the spring. Any decrease in tension of the spring resulting from decrease in its length as the lever moves in a counterclockwise direction (Figure 5), is compensated for by increase in the distance between the spring and shaft 25, i. e., as the spring tension decreases its lever arm increases. Hence a substantially constant force is exerted on each belt by the associated idler. The tension in the spring may, of course, be regulated by modifying the position of the bolt 36, adjustment being easily effected by manipulating the nuts 37.

The invention is in nowise limited to a power transmission mechanism utilizing any certain number of driving belts. An idler supported in the manner described will be found to be eminently useful where only one driving belt is employed or there may be a considerable number of belts, nine or eleven for instance, in which event the invention will be particularly helpful in that it permits the belts to be placed as close to each other as may be from the standpoint of design of the driving and driven pulleys. Minor changes may be made in the design without departure from the invention.

Having thus described the invention, what is claimed as new and desired to be secured by Letters Patent is:

1. A power transmission mechanism comprising a plurality of idler pulleys disposed in parallel planes each such pulley having a relatively wide rim and the adjacent edges of the rims of adjacent pulleys being disposed in closely spaced parallel planes, an axle upon which each pulley is rotatably supported, each axle being laterally offset from adjacent axles, and a supporting arm for each axle, each such arm extending outwardly from the associated axle in such direction as to pass the rim of the associated pulley at a point where that rim is outwardly offset from adjacent rims.

2. A power transmission mechanism comprising in combination a plurality of pulleys disposed in parallel planes and so that an arc of the rim of each is offset outwardly with respect to the rims of adjacent pulleys, an axle associated with each pulley and upon which the pulley is rotatably mounted, and an axle supporting arm extending radially outwardly from each axle and passing the rim of the associated pulley at a point along the outwardly offset arc thereof.

3. The combination set forth in claim 2 in which the rim of each pulley is relatively wide and the associated supporting arm is laterally deflected to pass around such rim.

4. The combination set forth in claim 2 in which the several pulley supporting arms are mounted for oscillation about a common axis.

5. A power transmission mechanism comprising a plurality of driving pulleys, a corresponding number of driven pulleys, a belt connecting each driving pulley to a driven pulley, an idler for each belt, means supporting the idlers, said means including an axle for each idler and upon which that idler is supported, an arm for each axle and upon which that axle is mounted, said arms being mounted for pivotal movement about a common axis, and supporting adjacent axles at different distances from said axis, an intermediate portion of each arm being laterally deflected so as to extend around the rim or felly of the pulley supported thereon, the laterally deflected portions of adjacent arms being offset with respect to each other so as not to interfere when said pulleys move relatively to each other.

6. In a power transmission mechanism, the combination with driving and driven pulleys and a flexible endless belt operatively connecting said pulleys, of an idler and means for causing said idler to bear against one reach of said belt at all times, said means including a lever disposed in substantial parallelism to the idler engaged reach of the belt, means supporting the lever for rocking movement about an axis intermediate its ends and closely adjacent said idler engaged reach of the belt, the arms of the lever extending in substantially opposite directions from said axis, said idler being rotatably supported upon said lever at one end thereof, a spring disposed closely adjacent to and in substantial parallelism to said lever and that reach of the belt which is engaged by the idler, a stationary spring abutment to which one end of said spring is secured, and means connecting the other end of the spring to that end of the lever which is remote from the idler to support such other end of the spring in offset relationship to a line passing through the axis about which the lever rocks and the axis about which the idler rotates, so that the tension in the spring will decrease and the moment arm of the spring will increase as the belt yields and the idler advances to maintain the pressure of the idler against the belt substantially constant for all positions of the idler.

JOHN HART WILSON.

REFERENCES CITED

The following references are of record in the file of this patent:

UNITED STATES PATENTS

| Number | Name | Date |
| --- | --- | --- |
| 439,790 | Pollock | Nov. 4, 1890 |
| 1,283,309 | Roby | Oct. 29, 1918 |
| 1,386,632 | Kornas | Aug. 9, 1921 |
| 1,605,962 | Lovejoy | Nov. 9, 1926 |
| 1,707,119 | Good | Mar. 26, 1929 |

FOREIGN PATENTS

| Number | Country | Date |
| --- | --- | --- |
| 260,077 | Germany | Nov. 8, 1911 |